United States Patent
Nakanishi et al.

(10) Patent No.: US 9,412,518 B2
(45) Date of Patent: Aug. 9, 2016

(54) METHOD AND APPARATUS FOR MOUNTING A LARGE CAPACITOR

(71) Applicant: Caterpillar Inc., Peoria, IL (US)

(72) Inventors: Todd Nakanishi, Brimfield, IL (US); Jon Husser, MaNabb, IL (US)

(73) Assignee: Caterpillar Inc., Peoria, IL (US)

( * ) Notice: Subject to any disclaimer, the term of this patent is extended or adjusted under 35 U.S.C. 154(b) by 387 days.

(21) Appl. No.: 14/132,338

(22) Filed: Dec. 18, 2013

(65) Prior Publication Data

US 2015/0170840 A1    Jun. 18, 2015

(51) Int. Cl.
*H05K 5/00*    (2006.01)
*H01G 4/224*   (2006.01)
*H01G 2/04*    (2006.01)

(52) U.S. Cl.
CPC . *H01G 4/224* (2013.01); *H01G 2/04* (2013.01)

(58) Field of Classification Search
USPC .......................................... 361/807, 809, 810
See application file for complete search history.

(56) References Cited

U.S. PATENT DOCUMENTS

| | | | | |
|---|---|---|---|---|
| 4,930,045 A | * | 5/1990 | Carlson | H01G 4/38 361/329 |
| 6,483,185 B1 | * | 11/2002 | Nagase | H01L 23/24 257/706 |
| 7,247,178 B2 | * | 7/2007 | Hirano | H01G 9/012 257/E21.008 |
| 7,652,875 B2 | * | 1/2010 | Tsuchida | H04N 5/64 361/679.21 |
| 7,957,169 B2 | | 6/2011 | Nakajima et al. | |
| 7,965,510 B2 | | 6/2011 | Suzuki et al. | |
| 8,369,100 B2 | | 2/2013 | Azuma et al. | |
| 8,502,632 B2 | * | 8/2013 | Suganuma | H01F 27/2804 336/200 |
| 8,637,979 B2 | * | 1/2014 | Miyamoto | H01L 23/4006 257/712 |
| 9,072,189 B2 | * | 6/2015 | Kosugi | H05K 7/1432 |
| 2006/0152085 A1 | | 7/2006 | Flett et al. | |
| 2008/0068775 A1 | * | 3/2008 | Imamura | H01G 2/106 361/301.1 |
| 2011/0181105 A1 | | 7/2011 | Michinaka et al. | |

FOREIGN PATENT DOCUMENTS

| | | |
|---|---|---|
| JP | 2005094942 | 4/2005 |
| JP | 2006216756 | 8/2006 |
| JP | 2012156402 | 8/2012 |
| JP | 2012243931 | 12/2012 |
| JP | 2013211325 | 10/2013 |

* cited by examiner

Primary Examiner — Hung S Bui

(74) Attorney, Agent, or Firm — Edward Lin

(57) ABSTRACT

A mounting arrangement for a capacitor package is disclosed. The capacitor package is suitable for use in electric drive traction applications that are subjected to high vibration. Such a capacitor package is relatively large and requires a unique mounting arrangement in order to account for a large mass and high vibration environment. The mounting arrangement provides a clamp load plane that is near the center of mass of the capacitor package.

8 Claims, 4 Drawing Sheets

METHOD AND APPARATUS FOR MOUNTING A LARGE CAPACITOR

TECHNICAL FIELD

The present disclosure relates to a package for large film capacitors suitable for use in power converters in mobile traction applications.

BACKGROUND

Power converters are commonly used to convert AC power from a generator to DC power, and then from DC power to AC power for use by a motor. Power conversion requires high-speed switching of large currents by power semiconductor devices, such as insulated gate bipolar transistors (IGBTs). Bulk capacitance is needed to dampen ripple current that occurs on the DC link that connects the different power conversion stages. The bulk capacitance also serves to filter out harmonic content and voltage spikes of the DC link voltage. Film capacitors are often the preferred choice for mobile applications and can be packaged and mounted in a variety of ways.

High vibration (up to 30 G) environments associated with heavy duty mobile applications increase the loads seen by electronic components. The large mass of the film capacitor package further increases the loads caused by vibration. The increased loads can lead to failures of the capacitor if the design of the mounting arrangement does not properly account for them.

One example of a prior art mounting arrangement can be found in United States Patent No. 20110,181,105 to Michinaka et al., issued Jul. 28, 2011, entitled "POWER CONVERSION APPARATUS FOR VEHICLE USE." FIG. 14 of Michinaka shows that there is a large distance between the mounting surface adjacent to mounting legs 37 and the center of mass of the capacitor module 17 (center of mass can be estimated from the figure). This large distance results in a large moment created by vibration forces. Further, the mounting legs 37 have a small thickness and therefore offer insufficient bolt stretch to maintain a proper bolted joint when subjected to high vibration forces. Therefore, it is seen that the design of Michinaka is not suited for heavy duty applications that are subjected to high vibration.

SUMMARY OF THE INVENTION

In one aspect, a capacitor package having a length, width, and height, and a center of mass is disclosed. The capacitor package comprises a first and second generally planar oppositely facing surface having said width and height. The first and second surfaces having a mounting protrusion configured to form a portion of a bolted joint and having a first protrusion surface and a second protrusion surface separated by a thickness. The first protrusion surface of each mounting protrusion forms a clamp load plane that passes within approximately 10% of the height of a parallel plane containing the center of mass.

In another aspect, a capacitor package is disclosed. The capacitor package comprises a first surface and a second surface interconnected to one another by at least a first wall and a second wall extending along a first axis, the first and second walls are separated from one another by a height along a second axis, each of the first and second surfaces extending along the second axis and a third axis, the first and second surfaces being generally planar and oppositely facing. The first, the second, and the third axes are perpendicular to one another. A mounting protrusion extends along the first axis from each of the first and second surfaces and configured to form a portion of a bolted joint, the mounting protrusion having a first protrusion surface and a second protrusion surface separated from one another along the second axis by a thickness. A plane extends through a center of mass of the package at a second dimension that is a percentage of the height. The first protrusion surface and the second protrusion surface are coplanar to define a clamp load plane parallel to the plane extending through the center of mass, wherein the clamping plane is oriented to extend within approximately 90% to about 110% of the second dimension.

In another aspect, a capacitor package having a length, width, and height, and a center of mass is disclosed. The capacitor package comprises a first and second generally planar oppositely facing surface having said width and height. The first and second surfaces having a mounting protrusion configured to form a portion of a bolted joint and having a first protrusion surface and a second protrusion surface separated by a thickness and a Nakanishi-Husser factor of at least two.

DETAILED DESCRIPTION

Figure 1:
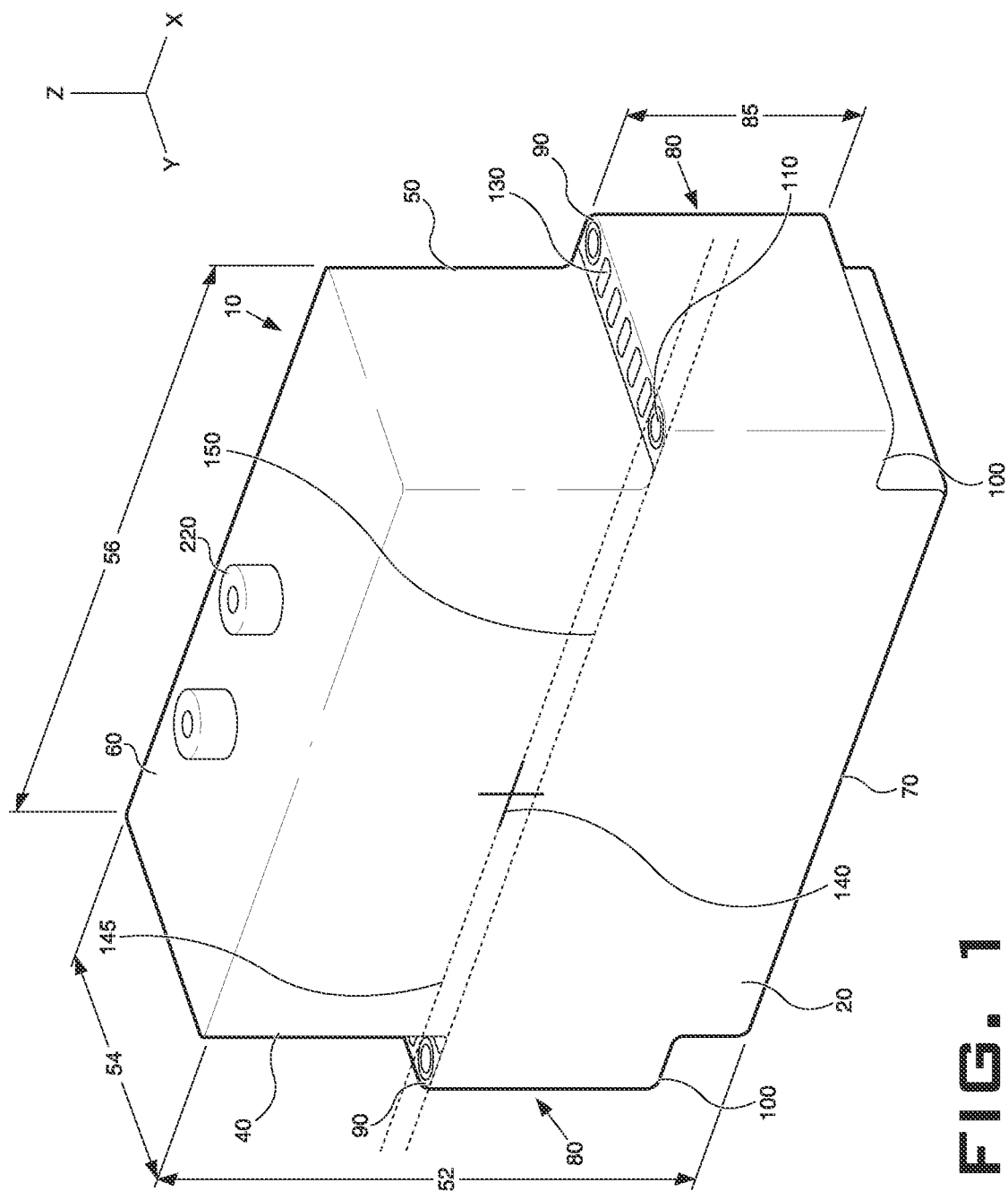
FIG. 1 is a perspective view of a capacitor package consistent with the current disclosure.
Figure 2:
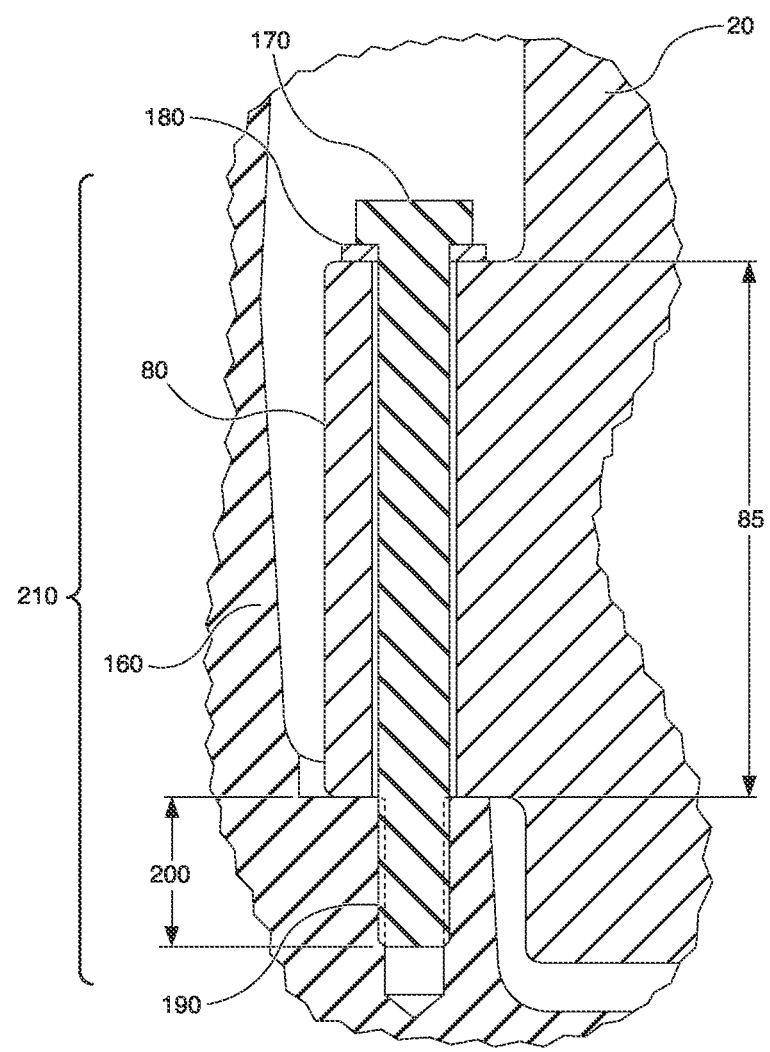
FIG. 2 is a view of a bolted joint consistent with the current disclosure.

The capacitor package 20 includes film capacitor components such as capacitive metallic films, dielectric films, electrodes, and internal connection features that are contained inside the capacitor case 30 and are not shown in the figures. The film capacitor components are designed to have a high functional density and therefore have significant mass. A potting material is added that fills the case 30 and surrounds the capacitor components in order to improve their vibration resistance properties.

The capacitor 10 is comprised of a capacitor package 20 that includes a first surface 40 and a second surface 50 interconnected by a first wall 60 and a second wall 70 that extend along a first axis. The first wall 60 and the second wall 70 are separated by a distance which corresponds to the height 52 of the capacitor package 20. The first surface 40 and the second surface 50 extend along the second axis and a third axis to a distance which corresponds to a width 54. The first surface 40 and second surface 50 have a mounting protrusion 80 that extends along the first axis. The mounting protrusion 80 is configured to serve as a portion of a bolted joint 210. The mounting protrusion 80 has a first protrusion surface 90 and a second protrusion surface 100 separated along the second axis by a mounting protrusion thickness 85. The mounting provision 80 includes at least one through-hole 110 that passes from the first protrusion surface 90 to the second protrusion surface 100. The through-hole 110 is designed to accept a fastener and may include a compression limiter 120. The compression limiter 120 may have two heads. The through-holes 110 are separated along the third axis at opposite ends of mounting provision 80. The mounting protrusion 80 may include material savers 130 located between the through-holes 110. The material savers 130 save weight from the case 30, reduce the amount of material needed to mold case 30, and may improve the molding process when case 30 is manufactured.

The capacitor package 20 further includes a pair of connection terminals 220 that are designed to connect a DC bus bar to the internal capacitor components. The connection terminals are typically threaded and accept a threaded fastener. The connection terminals 220 are only designed provide electrical and mechanical connection to the DC bus bar and are not suitable for securing the capacitor package 20 in place.

The capacitor package 20 has a mass m and a center of mass 140. The center of mass 140 may be located at the geometric center of the capacitor package 20. Depending on the distribution of the internal capacitor components, the center of mass 140 may be located in a slightly different location than the geometric center of the capacitor package 20. The mass m of the capacitor package 20 is relatively high for an electrical component and may be up to 5 kg or more. A center of mass plane 145 intersects the center of mass 140 and is parallel to a clamp load plane 150.

The capacitor package 20 is designed to be mounted to a housing 160. The housing 160 may serve as both the chassis and enclosure for a power converter and is made of metal, such as aluminum. The capacitor package 20 is mounted to the housing 160 by bolts 170. A washer 180 may be included between the bolt 170 and the mounting protrusion 80. An example of a suitable bolt 170 may be a socket head M8 bolt. A threaded hole 190 in the housing 160 receives the threaded end of bolt 170 to a depth specified by the required thread engagement 200. The bolt 170, mounting protrusion 80, through-hole 110, washer 180, and threaded hole 190 form a bolted joint 210. The capacitor package 20 is designed to include at least four bolted joints 210.

The bolted joint 210 forms a clamp load plane 150 that is coplanar with the first protrusion surface 90 of the mounting protrusion 80. The clamp load plane 150 is the plane on which the force of the bolted joint 210 is exerted.

Figure 3:
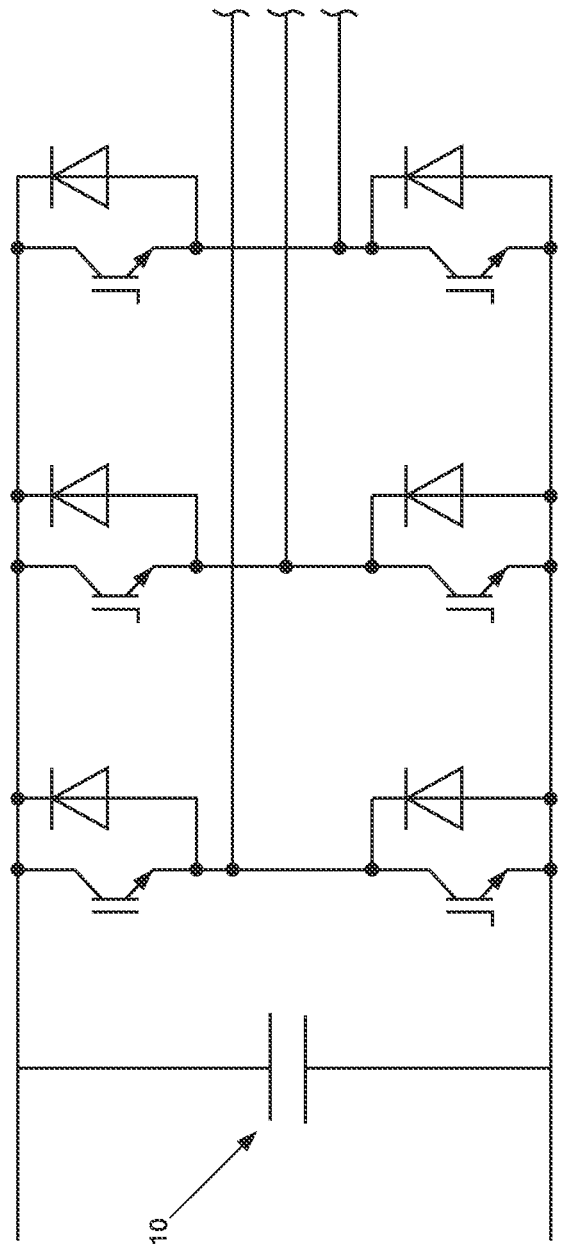
FIG. 3 shows a representative inverter circuit for use with the capacitor according to the current disclosure

The capacitor 10 is typically connected between the positive and negative leads of the direct current side of a power converter. The power converter may be composed of a bridge of six switches, such as IGBTs, in a configuration associated with permanent magnet or induction motor/generator technologies. The power converter may also be composed of IGBTs in a configuration associated with switched reluctance motor/generator technology. Refer to FIG. 3. The capacitor 10 forms part of a bulk capacitance that is designed to dampen current ripple and voltage spikes in the power converter circuit. Traction applications may specify a large amount of bulk capacitance, such as 10,000 F. The large bulk capacitance leads to a requirement for large capacitors 10. The large bulk capacitance and high vibration requirements of traction applications make capacitor design difficult.

INDUSTRIAL APPLICABILITY

Electric drive traction applications present an additional challenge for the electrical components designer. Designers of components for traditional stationary power converter applications do not have to consider high vibration. For instance, industrial motor controllers are often enclosed in a cabinet and located in a factory or other stationary facility where vibration is limited. Examples include industrial motors, blowers, and elevator controllers.

Automotive applications of electric drive are increasingly common Examples include parallel hybrid drivetrains, series hybrid drivetrains, and plug-in electric drivetrains. The power converters and components used in such applications experience much higher vibration profiles than stationary power converter applications. Acceleration, deceleration, and road imperfections all increase the amplitude and frequency of the vibration profiles experienced by the power converter and require specialized designs. For example, an automotive application may specify a 4.3 G rms profile.

Heavy duty electric drive traction applications experience even more severe vibration than automotive applications. Examples of heavy duty applications include construction machinery, mining equipment, and military machines. Construction machinery could include wheel loaders, track-type tractors, paving equipment, excavators, or motor graders. Mining equipment could include off-highway haul trucks, rope shovels, and drag lines. Military equipment could include armored vehicles, engineering machines, or battlefield-deployable power generation equipment.

The engineering requirements for heavy duty applications commonly exceed automotive requirements in vibration. There are several factors that contribute to the higher vibration profile of heavy duty equipment. First, heavy duty equipment requires high power and typically have larger engines than automobiles. The engines are typically diesel. The large engines produce higher vibration when idling and at rated power. Second, construction and mining equipment is typically equipped with a work implement for contacting and working the earth Impacts with the earth are transmitted through the work implement and into the equipment. Rocks in particular produce high-amplitude high-frequency vibration when contacted by work implements. Third, construction and mining equipment is commonly equipped with track-type ground engaging members. Examples of such machines include track-type tractors (or bulldozers) and excavators. Track-type ground engaging members comprise an endless chain wrapped around a drive and an idler sprocket. Grousers, or shoes, attach to the endless chain and contact the ground. Each time a grouser contacts the ground, shock and vibration from the contact is transmitted into the machine. The speed of the machine and the hardness of the material on which it travels both affect the vibration profile experienced by the machine. Vibration amplitude experienced by track-type machines is known to reach 10 G rms. Testing by the inventors of the current disclosure has shown that vibration amplitude can reach as high as 30 G rms.

Since heavy duty electric drive traction applications often require more power than automotive applications, the components of the electric drivetrain must be designed to handle more power. Example components include larger IGBTs, larger connectors, and larger capacitors. High vibration and large components make component design and mounting very challenging.

The mounting arrangement of an electrical component is critical in determining whether the component will fulfill its designed purpose. An electrical component must remain in the position in which it is mounted in order to maintain its electrical connections and to avoid damage from contact with the housing or other components. Threaded fasteners, a through-hole, and a mounting flange are commonly used to mount electrical components to a housing, chassis, or printed circuit board.

FIG. 1 shows a capacitor package 20 according to one aspect of the current disclosure. The mounting protrusion 80, through-hole 110, compression limiter 120, washer 180, and threaded hole 190 according to the current disclosure have been carefully designed to form a bolted joint 210 that meets the challenging requirements of a high-vibration environment. The normal force 230 provided by the bolted joint 210 should provide at least enough force to counteract the highest vibration force experienced by the capacitor package 20. In one aspect of the current disclosure, a normal force 230 with a safety margin of five times the highest vibration force is desired.

The mounting arrangement of the capacitor package 20 is configured to securely locate the capacitor package 20 to the housing 160 in all situations contemplated by the design. In one aspect of the current disclosure, the capacitor package 20 is mounted to the housing 160 by four bolts 170. Each bolt 170 is inserted into a through-hole 110 which is located at opposite ends of the mounting protrusion 80 and separated along the third axis. Since the capacitor package 20 is mounted using four bolted joints 210 each bolted joint 210 must provide one fourth of the required normal force 230. If six bolted joints 210 were used, then each bolted joint 210 must provide one sixth of the required normal force 230 and so on.

For instance, consider a capacitor package 20 with a mass of 4.29 kg. Each of the four bolted joints 210 must support a mass of 1.07 kg. If the capacitor package 20 experiences a 1 G vibration, each bolted joint must provide a normal force 230 of:

$$F_{1G}=m*a; 10.5N=1.07 \text{ kg}*9.81 \text{ m/s2}$$

If the capacitor package 20 experiences a 30 G vibration, each bolted joint must provide a normal force 230 of:

$$F_{30G}=m*a; 314.6N=1.07 \text{ kg}*30*9.81 \text{ m/s2}$$

The axial preload of a bolt 170 can be calculated as shown.

$$w=t/(k*d) \text{ axial clamp load}$$

Here "t" is the torque in Nm, "k" is the torque coefficient (assumes dry patch threadlocker that reduces fastener lubricity), and "d" is the diameter of the bolt.

For an M8 bolt 170, torqued to 10 Nm, the axial clamp load is calculated as:

$$3125N=10/(0.4*8)$$

Assuming that 50% of the clamp load is lost over time due to thermal effects, the final axial clamp load is:

$$1562N=3125N*0.5$$

Note that the final axial clamp load of 1562 N for one bolted joint 210 is five times $F_{30G}$ of 314.6 N. Therefore, as designed, each bolted joint is able to support one fourth of the mass of the capacitor package 20 at the maximum vibration force with a safety margin of five times. Also note that the torque on bolt 170 may be between 10 and 30 Nm.

Thermal expansion and contraction of the materials in the bolted joint 210 will change the clamp load and normal force 230 provided. The specified temperature range, for example, may be −40 to 85 C. The bolted joint 210 must provide enough force throughout the entire specified temperature range to maintain a sufficient normal force 230 to secure the capacitor package 20. The inventors have calculated that the bolt 170 must provide between 0.090 and 0.110 mm of expansion and contraction over the specified temperature range. If the bolt 170 were too short, the material in the bolt 170 would enter the plastic range of its stress/strain curve and would eventually fail. The material in bolt 170 must be kept in the linear elastic region of the stress/strain curve, referred to as the "working range" in the present disclosure. The bolt 170 must be sufficiently long in order for the material in bolt 170 to remain in the working range throughout the specified temperature range. Therefore, the mounting protrusion thickness 85 must be sufficiently large enough to accommodate a suitable bolt 170. In one example of the current disclosure, the bolt 170 measures 68 mm from the bottom of the bolt head to the first thread.

Force from vibration that is orthogonal to the normal force 230 should also be considered when designing the mounting arrangement of the capacitor package 20. One consideration is the location of the center of mass 140 relative to the clamp load plane 150. A force acting on a radius generates a torque. The torque is calculated by the expression:

$$T=r \times F$$

Here, r is the radius between center of mass 140 and the clamp load plane 150. Since the force F generated by vibration is given by F=m*g, torque becomes:

$$T=r \times (m*g)$$

As was discussed earlier in this disclosure, the mass m of the capacitor package 20 is quite large. It can be seen that in order to minimize the torque seen by the mounting arrangement caused by vibration, the radius r must be minimized One of the novel approaches according to the present disclosure is to design the mounting arrangement of the capacitor package 20 such that the distance between the center of mass 140 and the clamp load plane 150 is minimized Testing by the inventors has shown that the clamp load plane 150 must be located within 10% of the height from a plane that is parallel to the clamp load plane 150 and intersects the center of mass 140. Further, mounting protrusion thickness 85 must be sufficient to ensure that the material in bolt 170 is within the working range through the specified temperature range while maintaining a normal force 230 safety factor.

The inventors have discovered two factors that contribute to the design of a capacitor package 20 that has high mass and is subjected to a high vibration environment. Satisfaction of both factors will fulfill what is defined as the Nakanishi-Husser factor. One factor is satisfied if the mounting protrusion thickness 85 is within 33% and 60% of the height 52. A second factor is satisfied if the clamp load plane 150 is located within 10% of the height from a plane that is parallel to the clamp load plane 150 and intersects the center of mass 140.

Figure 4:
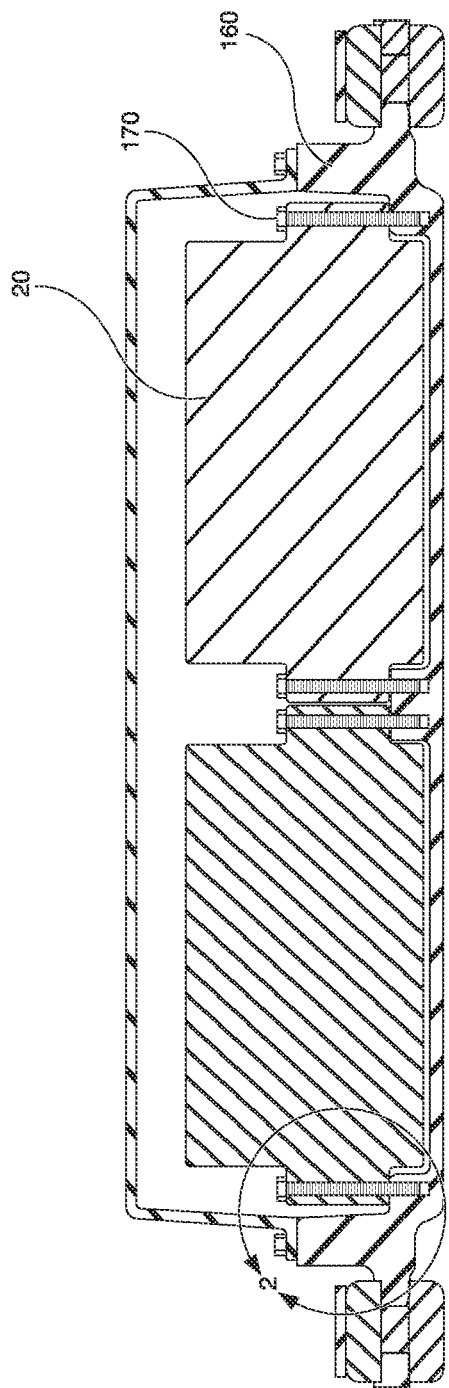
FIG. 4 shows the capacitor according to the current disclosure that is mounted to a housing.

The power converter that includes the capacitor package 20 may be itself mounted in any orientation within the vehicle or machine. For instance, the capacitor package 20 may be mounted into the power converter as shown in FIG. 4. However, the power converter may be mounted on a bulkhead that is orthogonal to a ground plane. The capacitor package 20 must be designed to allow different power converter mounting orientations.

What is claimed is:

1. A capacitor package having a length, width, and height, and a center of mass comprising:
    a first and second generally planar oppositely facing surface having said width and height;
    the first and second surfaces having a mounting protrusion configured to form a portion of a bolted joint and having a first protrusion surface and a second protrusion surface separated by a thickness; and
    wherein the first protrusion surface of each mounting protrusion forms a clamp load plane that passes within approximately 10% of the height of a parallel plane containing the center of mass, said mounting protrusion includes two through-holes that extend from the first protrusion surface to the second protrusion surface and material savers located between said through-holes.

2. The capacitor package of claim 1 wherein said thickness comprises between 33% and 60% of said height.

3. The capacitor package of claim 1 wherein the clamp load plane is coplanar with said center of mass.

4. The capacitor package of claim 1 wherein the second protrusion surface is continuous across said width.

5. A capacitor package comprising:
   a first surface and a second surface interconnected to one another by at least a first wall and a second wall extending along a first axis, the first and second walls are separated from one another by a height along a second axis, each of the first and second surfaces extending along the second axis and a third axis, the first and second surfaces being generally planar and oppositely facing, wherein the first, the second, and the third axes are perpendicular to one another;
   a mounting protrusion extending along the first axis from each of the first and second surfaces and configured to form a portion of a bolted joint, the mounting protrusion having a first protrusion surface and a second protrusion surface separated from one another along the second axis by a thickness;
   wherein a plane extends through a center of mass of the package at a second dimension that is a percentage of the height, wherein the first protrusion surface and the second protrusion surface are coplanar to define a clamp load plane parallel to the plane extending through the center of mass, wherein the clamping plane is oriented to extend within approximately 90% to about 110% of the second dimension;
   wherein said mounting protrusion includes two through-holes that extend from the first protrusion surface to the second protrusion surface parallel to the second axis, and material savers located between said through-holes; and
   said through-holes are separated along the third axis.

6. The capacitor package of claim 5 wherein said thickness is sized to be between 33% and 60% of the height.

7. The capacitor package of claim 5 wherein the clamp load plane is coplanar with said center of mass.

8. The capacitor package of claim 5 wherein the second protrusion surface is continuous across the third axis.

\* \* \* \* \*